Jan. 11, 1938.    A. DASSLER    2,104,973
GALVANIC BATTERY
Filed May 15, 1934    2 Sheets-Sheet 1
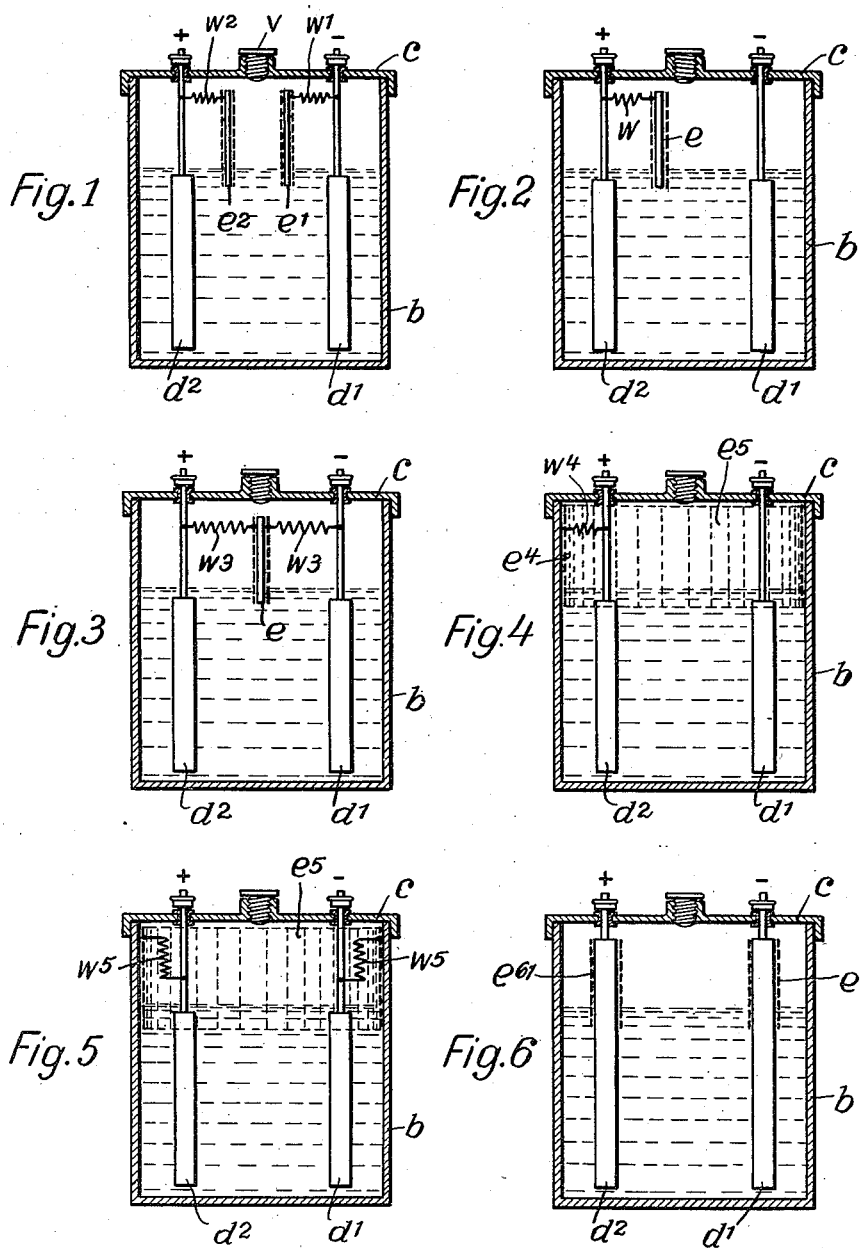
INVENTOR
Adolf Dassler
By
Frank Reinhold
ATTORNEY Jan. 11, 1938.  A. DASSLER  2,104,973
GALVANIC BATTERY
Filed May 15, 1934    2 Sheets-Sheet 2
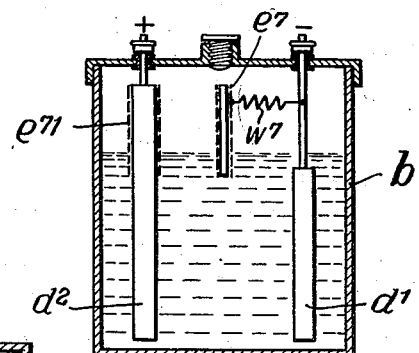
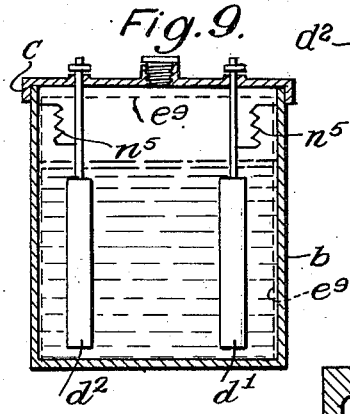
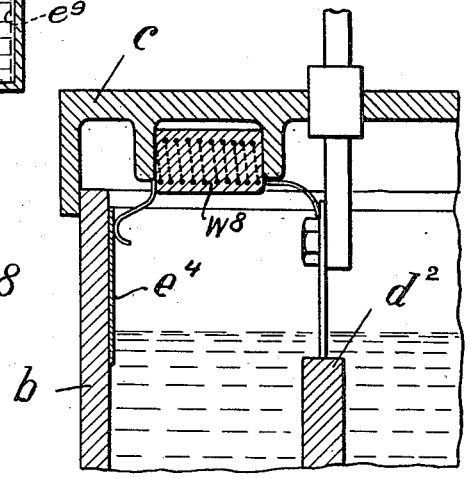
INVENTOR
Adolf Dassler
By
Franz Reichow
ATTORNEY Patented Jan. 11, 1938

2,104,973

UNITED STATES PATENT OFFICE 2,104,973

GALVANIC BATTERY

Adolf Dassler, Hagen, Germany

Application May 15, 1934, Serial No. 725,767
In Germany May 18, 1933

12 Claims. (Cl. 136—179)

My invention relates to improvements in primary and secondary galvanic batteries or cells.

As is known to those skilled in the art, oxygen and hydrogen are developed when storage batteries are charged and therefore care must be taken that the said gases may escape to the outer air in order to avoid bursting of the battery. Such gases are developed not only when the battery is charged but also when it is discharged, and even if it is on open circuit. Similar development of gas takes place in most of the primary batteries.

It has heretofore been proposed to remove the said gases by connecting the electrodes of a primary or secondary battery by means of a thin resistance wire which preferably consists of platinum and which is located within the gas chamber of the battery and is heated by the current passing therethrough. If in the gas chamber equivalent amounts of hydrogen and oxygen are developed the gases are entirely removed by being combined into water. However, equivalent amounts of the said gases are produced in primary elements and storage batteries only in exceptional cases and therefore it was impossible completely to dispose of the gases, and for this reason the method has not been used in a practical way.

The object of the improvement is to provide a primary or secondary galvanic battery or cell in which the gases are removed, although the amounts thereof are not equivalent, and even if a single gas is developed which cannot be combined with another gas developed simultaneously therewith. With this object in view my invention consists in causing the said gas or gases to be absorbed by means of subsidiary hydrogen and/or oxygen electrodes which are in contact with the gas or gaseous mixture and which are partly immersed into the electrolyte, the said subsidiary or absorbing electrodes having a potential relatively to the electrolyte which supports absorption of gas.

For the purpose of explaining the invention several examples embodying the same have been shown in the accompanying drawings in which the same reference characters have been used in all the views to indicate corresponding parts. In said drawings, Fig. 1 is a somewhat diagrammatical sectional elevation showing a storage battery provided with subsidiary or absorbing electrodes, Figs. 2 to 7 are similar sectional elevations showing modifications.

Fig. 8 is a detail sectional elevation on a larger scale showing the manner of mounting the resistance on the lid of the battery, and Fig. 9 is a sectional elevation showing another modification.

Referring at first to Fig. 1, a storage battery $b$ is provided with a negative main electrode $d^1$ and a positive main electrode $d^2$. In addition two subsidiary or absorbing electrodes $e^1$ and $e^2$ are provided, which are immersed with their bottom ends into the electrolyte and which are connected, preferably through resistances $w^1$ and $w^2$, with the main electrodes $d^1$ and $d^2$ the said subsidiary electrodes having coatings of platinum or platinum sponge. The casing $b$ is closed by a lid $c$ which is provided with a screw plug $v$ for closing the casing $b$ in a gas-tight way. The main electrodes $d^1$ and $d^2$ and the subsidiary electrodes $e^1$ and $e^2$ are carried by the lid $c$ in a manner known in the art. If gases, for example hydrogen and oxygen are developed within the battery, mainly the oxygen is absorbed and ionized by the coating of the subsidiary electrode $e^1$, which has a negative potential. Moreover catalysis between oxygen and hydrogen takes place on said electrode $e^1$. The surplus hydrogen is absorbed and ionized by the coating of the subsidiary electrode $e^2$, which has a positive potential. Therefore all the gases are removed from the chamber within the electrolyte in the form of ions.

In the modification shown in Fig. 2 a single subsidiary electrode $e$ is provided which is connected with one of the main electrodes $d^1$ or $d^2$, a resistance $w$ being preferably provided between the said subsidiary and main electrodes.

In Fig. 3 I have shown a modification which is similar to the one illustrated in Fig. 2, in which however the subsidiary electrode $e$ is electrically connected through resistances $w^3$ and $w^3$ with both electrodes $d^1$ and $d^2$.

In Fig. 4 I have shown another modification in which the subsidiary electrode is provided by the wall of the casing of the battery, the said casing being either made from metal or having its inner surface coated with metal. As shown in the figure the casing $b$ is provided internally with a metallic coating $e^4$, the said coating being immersed into the electrolyte. In the figure it has been indicated by broken lines. The coating $e^4$ is connected with one of the electrodes $d^1$ or $d^2$ through a resistance $w^4$.

The modification shown in Fig. 5 is similar to the one illustrated in Fig. 4. But the metallic coating $e^5$ of the top part of the inner wall of the casing $d$ is connected with both electrodes $d^1$ and $d^2$ through resistances $w^5$, $w^5$.

In the modification shown in Fig. 6 the subsidiary electrodes $e^6$ and $e^{61}$ are combined with the main electrodes $d^1$ and $d^2$, the said electrodes being coated at their top parts with platinum, palladium, or other similar metal, and the said coating metal is immersed into the electrolyte. Preferably the coating is applied in a state of fine distribution and with a large and rough surface.

The construction shown in Fig. 6 is particularly suitable in alkaline storage batteries. Ordinarily the coating of the positive electrode mainly absorbs hydrogen while the coating of the negative electrode mainly absorbs oxygen. In addition on the parts of the electrodes which are coated with platinum or the like, and which have but insufficient contact with the electrolyte oxygen and hydrogen are absorbed and combined by catalysis into water.

The construction shown in Fig. 6 is particularly simple. But it cannot always be used in galvanic elements and storage batteries. For example, in a lead storage battery the negative electrode or parts thereof cannot be coated with platinum, because the potential of the said electrode is too high, so that oxygen would hardly be absorbed, and, on the contrary, a more energetic development of hydrogen would take place on the platinum.

In such cases I prefer to use the constructions shown in Figs. 2 and 3, or the construction shown in Fig. 7. In this construction a subsidiary electrode $e^7$ is provided which is located in the gas chamber and partly immersed into the electrolyte. The said subsidiary electrode consists either of platinum or a metal of similar character, or of a base material such as electrode carbon which has sufficient stability against sulfuric acid and conductivity, the said base material being in contact or coated or impregnated with a suitable metal such as platinum. The said subsidiary electrode is connected, through a resistance $w^7$, with the negative main electrode $d^1$. As shown in the figure a second subsidiary electrode $e^{71}$ is combined with the main positive electrode $d^2$, the said subsidiary electrode taking the form of a coating of platinum sponge. The platinum coating $e^{71}$ of the positive electrode $d^2$ absorbs hydrogen and carries the same downwardly and into the electrolyte, where it is combined with the oxygen or $SO_4$. The subsidiary electrode $e^7$ absorbs the oxygen which is combined with the hydrogen developed on the immersed part of the said electrode.

The third electrode $e^7$ may also be provided by the case or a coating of the case of the battery, which is connected with one of the electrodes through a resistance as is shown in Fig. 4, and it may also be connected through resistances with both electrodes $d^1$ and $d^2$, as is shown in Fig. 5. Thereby a nearly constant potential is maintained on the said coating of the case, which has a value between the positive and negative main electrodes of the battery, and which is adapted to absorb hydrogen as well as oxygen. Preferably the resistance wires $w^5$, $w^5$ of the battery shown in Fig. 5 are such that only a very weak current is taken from the battery so that the capacity is not practically reduced.

The use of the inner wall as an absorption electrode for hydrogen or oxygen or for hydrogen and oxygen is particularly useful in many alkaline batteries. In such batteries the casing is ordinarily made from nickel-coated sheet iron and therefore a particularly thin coating of platinum or similar metal may be readily applied to the inner surface of the casing without materially changing the construction of the casing.

In another modification I coat the whole inner surface of the wall of the case with platinum or the like and connect the said coating with one or both main electrodes through resistances. A battery of this construction can be used in any position. This modification is shown in Fig. 9 which is similar to the construction shown in Fig. 5. The wall of the casing $b$ is provided with a coating $e^9$ covering the whole surface thereof. The other parts have received the same reference characters as the corresponding parts shown in Fig. 5, and therefore a detailed description of the parts is not necessary.

In all the constructions shown herein the casing $b$ may be closed in a gas-tight way.

In the foregoing the subsidiary electrodes have been described as being coated with platinum or platinum sponge. But I wish it to be understood that I do not limit myself to this metal, and that any other metallic conductor may be used which is adapted to transform the gases into ionic state. Such metals are particularly the aforesaid platinum and metals similar in character to platinum such as rhodium, ruthenium, palladium and iridium. Preferably the metal is used in a finely distributed state so as to have large surfaces, in order that there be a most intimate contact with the gas.

It will be understood that the formation of the subsidiary electrode as a coated structure is a feature enforced by practical consideration. Platinum, the preferred coating metal, is a metal far too precious to permit of its use in any other manner. The platinum-coated electrode is, functionally, a platinum electrode; it is as though the electrode were a homogeneous body of platinum, with surface of proper character. It will, accordingly, be understood that when in the ensuing claims I use the phrases, "a subsidiary electrode of hydrogen-ionizing metal", "a subsidiary electrode of platinum", and the like, I include an electrode that in its formation is such a coated structure as I have particularly specified.

The resistances through which the subsidiary electrodes and particularly the coating of the wall of the casing is connected with the main electrode or electrodes are preferably mounted on the lid of the battery. As it shown in Fig. 8 the said resistance wire is preferably wound into a small coil $w^8$ carried internally or externally by the said lid. Preferably the said coil is protected by insulating material such as vulcanized rubber.

In the construction shown in the figures the subsidiary electrodes are connected with the main electrodes for applying the desired potential thereto. But I wish it to be understood that I do not limit myself to this method of applying the potential to the subsidiary electrodes, and that the potential may also be supplied by a separate source thereof.

I claim:

1. In a galvanic battery comprising a receptacle containing an electrolyte with a gas chamber above the surface of the electrolyte and main electrodes in contact with the electrolyte, said main electrodes being capable of producing electrical energy in an external circuit connected therewith, means for preventing the accumulation of gas within the chamber above the electrolyte, such means consisting of a subsidiary electrode of gas-absorbing and -ionizing metal extending at one end into the gas chamber of the battery and at the opposite end into the electrolyte, and connected when the battery is in service to a source of electrical potential, relatively to the electrolyte.

2. In a galvanic battery comprising a receptacle containing an electrolyte with a gas chamber above the surface of the electrolyte and main electrodes in contact with the electrolyte, said main electrodes being capable of producing electrical energy in an external circuit connected therewith, means for preventing the accumulation of gas within the chamber above the electrolyte, such means consisting of a subsidiary electrode of hydrogen-absorbing and -ionizing metal extending at one end into the gas chamber of the battery and at the opposite end into the electrolyte and connected when the battery is in service to a source of electrical potential relatively to the electrolyte.

3. In a galvanic battery comprising a receptacle containing an electrolyte with a gas chamber above the surface of the electrolyte and main electrodes in contact with the electrolyte, said main electrodes being capable of producing electrical energy in an external circuit connected therewith, means for preventing the accumulation of gas within the chamber above the electrolyte, such means consisting of a subsidiary electrode of platinum extending at one end into the gas chamber of the battery and at the opposite end into the electrolyte and connected when the battery is in service to a source of electrical potential relatively to the electrolyte.

4. In a galvanic battery comprising a receptacle that contains an electrolyte with a gas chamber above the surface of the electrolyte and main electrodes extending into the gas chamber above and into the electrolyte below, said main electrodes being capable of producing electrical energy in an external circuit connected therewith, means for preventing the accumulation of gas within the chamber above the electrolyte, such means consisting of a subsidiary electrode of gas-absorbing and -ionizing metal forming an incomplete coating upon the surface of one of the main electrodes and extending in continuity upon the surface of the main electrode both into the gas chamber above and into the electrolyte below and leaving portions of the surface of the main electrode uncovered beneath the surface of the electrolyte.

5. In a galvanic battery comprising a receptacle that contains an electrolyte with a gas chamber above the surface of the electrolyte and main electrodes in contact with the electrolyte, said main electrodes being capable of producing electrical energy in an external circuit connected therewith, means for preventing the accumulation of gas within the chamber above the electrolyte, such means consisting of two subsidiary electrodes of gas-absorbing and -ionizing metal each extending at one end into the gas chamber of the battery and at the opposite end into the electrolyte and connected when the battery is in service to a source of electrical potential relatively to the electrolyte.

6. In a galvanic battery comprising a receptacle that contains an electrolyte with a gas chamber above the surface of the electrolyte and main electrodes in contact with the electrolyte, said main electrodes being capable of producing electrical energy in an external circuit connected therewith, means for preventing the accumulation of gas within the chamber above the electrolyte, such means consisting of two subsidiary electrodes of gas-absorbing and -ionizing metal extending each at one end into the gas chamber of the battery and at the opposite end into the electrolyte and severally connected electrically, each to one of the main electrodes.

7. A galvanic battery comprising a receptacle containing an electrolyte and having a gas chamber, main electrodes in contact with said electrolyte, said main electrodes being capable of producing electrical energy in an external circuit connected therewith, and a subsidiary gas electrode having a continuous gas-absorbing portion partly in position for acting on the gas within said gas chamber and partly immersed in the electrolyte, in which the subsidiary gas electrode is provided by a metallic part of the said receptacle.

8. A galvanic battery comprising a receptacle containing an electrolyte and having a gas chamber, main electrodes in contact with said electrolyte, said main electrodes being capable of producing electrical energy in an external circuit connected therewith, and a subsidiary gas electrode afforded by a metallic coating upon the inner wall of the said receptacle, said coating extending both below and above the surface of the electrolyte within the receptacle.

9. A galvanic battery comprising a receptacle containing an electrolyte and having a gas chamber, main electrodes in contact with said electrolyte, said main electrodes being capable of producing electrical energy in an external circuit connected therewith, and a subsidiary gas electrode having a continuous gas-absorbing portion partly in position for acting on the gas within the said gas chamber and partly immersed in the electrolyte, such subsidiary gas electrode being afforded as a metallic part of the wall of said receptacle and in which such metallic part is electrically connected through a resistance with one of the main electrodes.

10. A galvanic battery comprising a receptacle containing an electrolyte and having a gas chamber, main electrodes in contact with said electrolyte, said main electrodes being capable of producing electrical energy in an external circuit connected therewith, and a subsidiary electrode in the form of a metallic part of the wall of said receptacle extending both above and below the surface of the electrolyte, such metallic part being electrically connected above the surface of the electrolyte with one of the main electrodes.

11. A galvanic battery comprising a receptacle containing an electrolyte and having a gas chamber, main electrodes in contact with said electrolyte, said main electrodes being capable of producing electrical energy in an external circuit connected therewith, and a subsidiary gas electrode having a continuous gas-absorbing portion partly in position for acting on the gas within said gas chamber and partly immersed in the electrolyte, such subsidiary gas electrode being provided in the form of a metallic part of the wall of said receptacle electrically connected through resistance with both main electrodes.

12. A galvanic battery comprising a receptacle containing an electrolyte and having a gas chamber, main electrodes in contact with said electrolyte, said main electrodes being capable of producing electrical energy in an external circuit connected therewith, and a subsidiary gas electrode afforded by a metallic part of said receptacle extending above and below the surface of said electrolyte, and leads, each including a resistance, connecting such metallic part of the receptacle with both of the main electrodes.

ADOLF DASSLER.